US012689303B2

(12) United States Patent
Wang et al.

(10) Patent No.: US 12,689,303 B2
(45) Date of Patent: Jul. 21, 2026

(54) FLEXIBLE POWER SUPPLY DEVICE FOR AC ARC FURNACE, AND CONTROL METHOD THEREOF

(71) Applicant: RONGXIN HUIKO ELECTRIC CO., LTD., Anshan (CN)

(72) Inventors: Wenlong Wang, Anshan (CN); Haiqing Weng, Anshan (CN); Paolo Antonio Bordignon, Anshan (CN); Haitao Zhang, Anshan (CN); Yu Zhang, Anshan (CN); Ying Niu, Anshan (CN); Xin Wang, Anshan (CN)

(73) Assignee: RONGXIN HUIKO ELECTRIC CO., LTD., Anshan (CN)

( * ) Notice: Subject to any disclaimer, the term of this patent is extended or adjusted under 35 U.S.C. 154(b) by 0 days.

(21) Appl. No.: 19/141,196

(22) PCT Filed: Jun. 26, 2024

(86) PCT No.: PCT/CN2024/101628
§ 371 (c)(1),
(2) Date: Jun. 19, 2025

(87) PCT Pub. No.: WO2025/123644
PCT Pub. Date: Jun. 19, 2025

(65) Prior Publication Data
US 2026/0045889 A1 Feb. 12, 2026

(30) Foreign Application Priority Data
Dec. 14, 2023 (CN) ......................... 202311723972.9

(51) Int. Cl.
H02M 5/458 (2006.01)
H05B 7/06 (2006.01)
H05B 7/148 (2006.01)

(52) U.S. Cl.
CPC ............ *H02M 5/4585* (2013.01); *H05B 7/06* (2013.01); *H05B 7/148* (2013.01)

(58) Field of Classification Search
CPC ............ H02M 5/40; H02M 5/42; H02M 5/44; H02M 5/443; H02M 5/45; H02M 5/4505;
(Continued)

(56) References Cited

U.S. PATENT DOCUMENTS

2011/0176575 A1 7/2011 Hörger et al.
2024/0305202 A1* 9/2024 Permuy ................... H02J 3/002

FOREIGN PATENT DOCUMENTS

CN 204013248 U 12/2014
CN 104410256 A 3/2015
(Continued)

*Primary Examiner* — Bryan R Perez
(74) *Attorney, Agent, or Firm* — IPro, PLLC

(57) ABSTRACT

The embodiments of the present disclosure provide a flexible power supply device for an AC arc furnace and a control method thereof, which are applied in the technical field of power supply. The flexible power supply device for an AC arc furnace comprises a rectifier bridge, an inverter bridge, an arc furnace transformer, a rectifier bridge controller, an inverter bridge controller and an electrode position controller, wherein the rectifier bridge is connected to an AC power grid, and the inverter bridge is connected to an AC arc furnace transformer; and, the rectifier bridge controller is responsible for controlling the rectifier bridge and stabilizing a DC voltage of the rectifier bridge, and the inverter bridge controller is responsible for controlling the inverter bridge and stabilizing a primary side current of the AC arc furnace transformer. The flexible power supply device for an AC arc furnace realizes the double isolation of the fluctuation of the AC arc furnace from a power supply system through the inverter bridge and the rectifier bridge, thus significantly reducing the flicker of the power grid caused by the fluc-
(Continued)

tuation of the AC arc furnace and reducing the influence of the smelting process of the arc furnace on the power grid.

7 Claims, 4 Drawing Sheets

(58) Field of Classification Search
CPC ...... H02M 5/451; H02M 5/452; H02M 5/458; H02M 5/4585; H02M 5/293; H02M 5/297; H02M 5/275; H02M 5/22
See application file for complete search history.

(56) References Cited

FOREIGN PATENT DOCUMENTS

| | | | |
|---|---|---|---|
| CN | 106849144 | A | 6/2017 |
| CN | 109193655 | A | 1/2019 |
| CN | 113726136 | A | 11/2021 |
| WO | 2023098217 | A1 | 6/2023 |

* cited by examiner

FLEXIBLE POWER SUPPLY DEVICE FOR AC ARC FURNACE, AND CONTROL METHOD THEREOF

TECHNICAL FIELD

The present disclosure relates to the field of power supply technology, and in particular to a flexible power supply device for an AC arc furnace, and a control method thereof.

BACKGROUND OF THE PRESENT INVENTION

AC arc furnace uses scrap steel and iron as the main raw materials, and utilizes high-temperature arcs generated between electrodes and the charge to heat and melt the charge. Traditional AC arc furnace uses transformer to reduce the voltage of AC power, and then limits the current of the arc furnace under normal operation and short-circuit conditions through series reactors. And the electric arc is stabilized by controlling the rise and fall of electrodes. The Traditional AC arc furnace offers advantages such as flexible temperature control, high thermal efficiency, simple and reliable equipment, and short process flows.

However, with the increasing capacity of an individual AC arc furnace, the interference of the AC arc furnace with the power supply system is also increasingly prominent. When the electric arc is extinguished, the active and reactive power drops to zero, and when the electrode is short-circuited with the charge, the reactive power consumed by the AC arc furnace reaches its maximum value. During the melting period of the furnace charge, due to the random variation and rapid fluctuation of the electric arc length, the AC arc furnace cause strong flicker, asymmetric, and high-order harmonic currents in the power supply system.

To solve the interference of the AC arc furnace on the power supply system, the industry commonly uses the STATCOM to compensate dynamic reactive power and reduce flicker, but this method requires a large capacity STATCOM equipment and has limited flicker suppression effects. Another option is multiple power electronic converters connected in parallel with grid side multi winding phase-shifting transformers, which isolates the fluctuations of the AC arc furnace from the power supply system to the arc furnace. However, this method requires multi-winding phase-shifting transformers on the grid side, which is complex and costly. In addition, a large number of existing AC arc furnaces are powered by transformers connecting to medium AC voltage, and the above method directly generate a low-voltage and high-current power supply, which cannot be used for the retrofit of the existing AC arc furnace systems.

The industry also adopts modular multilevel converters, which can directly realize high-voltage AC/high-voltage DC conversion and are suitable for providing flexible power supply for AC arc furnaces, but the cost is high. In order to reduce the cost of the converter, as the AC arc furnace is always consuming power and there is no possibility of energy feedback, diode rectifier with modular multilevel bridge is another option. However, the control of this topology is complex, and grid current is non-sinusoidal with excessive harmonic.

SUMMARY OF THE PRESENT INVENTION

The present disclosure provides a flexible power supply device and a control method for an AC arc furnace, which reduce the flicker caused by AC arc furnace on the power supply system.

According to the first aspect of the present disclosure, a flexible power supply device for an AC arc furnace is provided, including: a rectifier bridge, an inverter bridge, an arc furnace transformer, a rectifier bridge controller, an inverter bridge controller and an electrode position controller. The rectifier bridge is connected to an AC power grid, and the inverter bridge is connected to the AC arc furnace transformer, Wherein the rectifier bridge comprises three-phase rectifier bridge arms, and the inverter bridge includes at least one-phase inverter bridge arm. And the three-phase rectifier bridge arms and the at least one-phase inverter bridge arm are sequentially arranged and connected in parallel through positive and negative DC busbars. The rectifier bridge arm of each phase has the same structure, including an upper rectifier bridge arm, a middle rectifier bridge arm, a lower rectifier bridge arm, and two diode bridge arms. The upper rectifier bridge arm, the middle rectifier bridge arm, and the lower rectifier bridge arm are sequentially connected in series. After the two diode bridge arms are connected in series in the same direction, they are parallel connected at both ends of the rectifier middle bridge arm. The connection point of the two diode bridge arms is connected to each phase of the AC power supply grid. And the at least one-phase inverter bridge arm include an upper inverter bridge arm and a lower inverter bridge arm, respectively. The upper inverter bridge arm and the lower inverter bridge arm are connected in series, and the connection point is connected to the corresponding phase of the electric arc furnace transformer.

In accordance with the aspect described above and any possible implementation, an implementation is further provided, wherein the inverter bridge includes three-phase inverter bridge arms, and the connection points of the upper and lower bridge arms of the three-phase inverter bridge are respectively connected to each phase of the arc furnace transformer.

In accordance with the aspect described above and any possible implementation, an implementation is further provided, wherein the upper rectifier bridge arm, the lower rectifier bridge arm, the upper inverter bridge arm and the lower inverter bridge arm are the same in structure and each formed by connecting a reactor and at least two power modules in series. And the middle rectifier bridge arm is formed by connecting at least two power modules in series. And the power module is a half-bridge module and/or a full-bridge module.

In accordance with the aspect described above and any possible implementation, an implementation is further provided, wherein the number of the power modules is determined based on the maximum voltage across the bridge arm and the capacitor voltage of the power modules.

In accordance with the aspect described above and any possible implementation, an implementation is further provided, wherein the electrode position controller is connected to an electrode manipulation mechanism of the AC arc furnace.

In accordance with a second aspect of the present disclosure, a control method for a flexible power supply device of an AC arc furnace is provided, including steps of: the rectifier bridge controller is responsible for controlling the rectifier bridge and stabilizing the DC voltage of the rectifier bridge, the inverter bridge controller is responsible for inverter bridge control and stabilizing the primary side current of the AC arc furnace transformer, and the electrode position controller is responsible for controlling the electrode manipulation mechanism of the AC arc furnace and stabilizing a three-phase arc impedance.

In accordance with the aspect described above and any possible implementation, an implementation is further provided, wherein the rectifier bridge is responsible for controlling the rectifier bridge and stabilizing the DC voltage of the rectifier bridge, including:

monitor the grid-side voltage of the rectifier bridge, and track the phase of the power grid through a phase-lock-loop (PLL);

based on the relationship between a DC voltage $u_{dc}$ of the rectifier bridge and a DC voltage command value $u_{dc}*$ of the rectifier bridge, generating an active current command value $i_d*$ of the rectifier bridge through a DC voltage controller;

based on the active current command value $i_d*$ of the rectifier bridge, calculating reactive power consumed on a grid-side impedance, and generating a reactive current command value $i_q*$ of the rectifier bridge to compensate the reactive power consumed on the grid-side impedance;

generating dq voltage command values $u_d*$ and $u_q*$ of the rectifier bridge from the active current command value $i_d*$ of the rectifier bridge and the reactive current command value $i_q*$ of the rectifier bridge through a current regulator, and generating AC modulation command values $u_a*$, $u_b*$ and $u_c*$ of the rectifier bridge through ⅔ conversion;

calculating a DC modulation command value $u_{com}*$ of the rectifier bridge:

$$u_{com}^* = \frac{\text{the DC voltage command value } u_{dc}^* \text{ of the rectifier bridge}}{2u_N},$$

where $u_N$ is the capacitor voltage of the power modules;

adding or subtracting the AC modulation command value of the rectifier bridge and the DC modulation command value of the rectifier bridge, and obtaining a trigger pulse of each rectifier bridge arm according to the arm current direction using nearest level modulation (NLM).

In accordance with the aspect described above and any possible implementation, an implementation is further provided, wherein the inverter bridge controller is responsible for controlling the inverter bridge and stabilizing a primary side current of the AC arc furnace transformer, including:

controlling a current $i_d$ and a current $i_q$ according to an active current command value $i_d*$ of the inverter bridge and a reactive current command value $i_q*$ of the inverter bridge through a current regulator, and generating dq voltage command values $u_d*$ and $u_q*$ of the inverter bridge, and generating AC modulation command values $u_a*$, $u_b*$ and $u_c*$ of the inverter bridge through ⅔ conversion, where the active current command value $i_d*$ of the inverter bridge is a preset value, and the reactive current command value $i_q*$ of the inverter bridge is preset as 0;

calculating a DC modulation command value $u_{com}*$ of the inverter bridge:

$$u_{com}^* = \frac{\text{the DC voltage command value } u_{dc}^* \text{ of the inverter bridge}}{2u_N},$$

where $u_N$ is the capacitor voltage of the power modules; subtracting the DC modulation command value of the inverter bridge from the AC modulation command value of the inverter bridge to obtain the modulation signal for each inverter upper bridge arm, and adding the DC modulation command value of the inverter bridge and the AC modulation command value of the inverter bridge to obtain the modulation signal for each lower inverter bridge arm, and finally obtaining a trigger pulse of each bridge arm of the inverter bridge by nearest level modulation (NLM).

In accordance with the aspect described above and any possible implementation, an implementation is further provided, wherein the electrode position controller being responsible for controlling the electrode manipulation mechanism of the AC arc furnace and stabilizing the three-phase arc impedance includes: detecting a secondary voltage and current of the AC arc furnace transformer, and calculating the current three-phase arc impedance of the AC arc furnace according to the voltage and the current; and according to the relationship between the three-phase arc impedance and an arc impedance command value, generating and sending a control command to the electrode manipulation mechanism of the arc furnace to adjust the electrode position.

In accordance with a third aspect of the present disclosure, a method for operating a flexible power supply device for an AC arc furnace is provided, including steps of:

controlling, by the rectifier bridge controller, the rectifier bridge to stabilize a DC voltage and reduce the flicker of the AC power grid, so that energy flows from the AC power gird to a DC bus through the rectifier bridge;

stabilizing, by the inverter bridge controller, a primary side current of the arc furnace transformer, so that energy flows from the DC bus to the arc furnace through the inverter bridge;

controlling, by the electrode position controller, the electrode manipulation mechanism of the AC arc furnace and stabilizing a three-phase arc impedance.

It should be understood that the content described in the summary is not intended to limit the crucial or important features of the embodiments of the present disclosure and the scope of the present disclosure. The other features of the present disclosure will become understandable from the following description.

BRIEF DESCRIPTION OF THE DRAWINGS

The above and other features, advantages and aspects of the embodiments of the present disclosure will become apparent with reference to the accompanying drawings and the following detailed description. The accompanying drawings are used for better understanding the scheme, and do not constitute any limitations to the present disclosure. Throughout the accompanying drawings, the same or similar reference numerals indicate the same or similar elements, in which.

DETAILED DESCRIPTION OF THE PRESENT INVENTION

In order to clarify the purpose, technical solution, and advantages of this disclosed embodiment, a clear and complete description of the technical solution in this disclosed embodiment will be provided below in conjunction with the accompanying drawings. Obviously, the described embodiments are a part of this disclosed embodiment, not the entire embodiment. Based on the embodiments disclosed in this disclosure, all other embodiments obtained by ordinary skilled persons in this field without creative labor are within the scope of protection of this disclosure.

In addition, the term "and/or" in this article is only a description of the association relationship between related objects, indicating that there can be three types of relationships, for example, A and/or B, which can represent: the existence of A alone, the existence of A and B at the same time, and the existence of B alone. In addition, the character "/" in this article generally indicates that the related objects before and after are in an "or" relationship.

Figure 1:
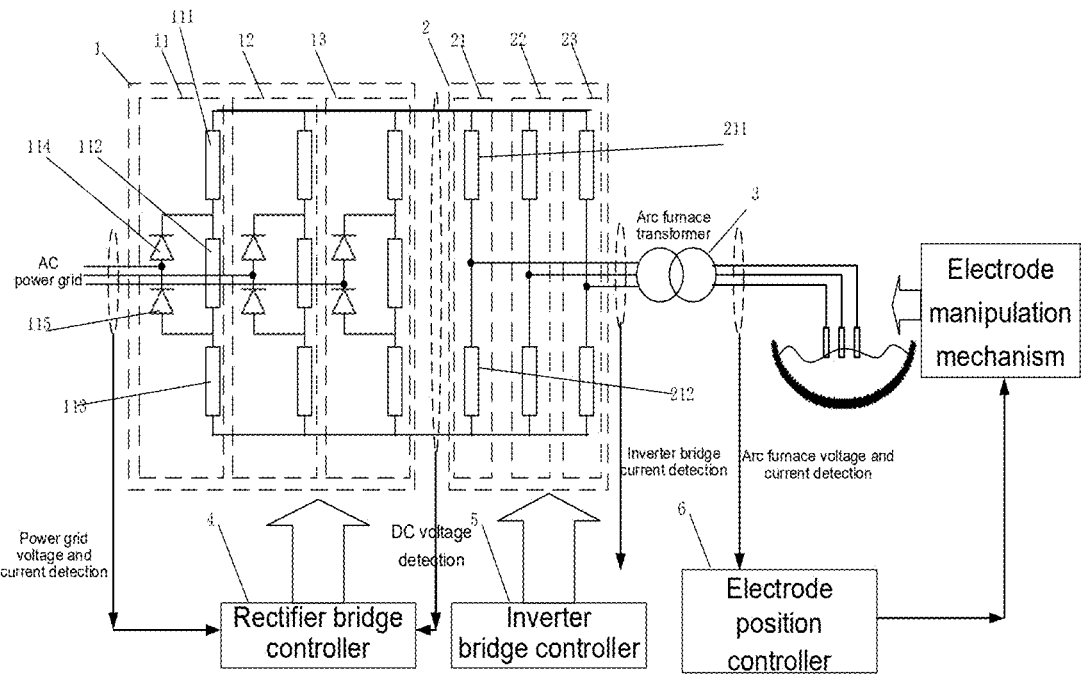
FIG. 1 shows a block diagram of a flexible power supply device for an AC arc furnace according to an embodiment of the present disclosure.

FIG. 1 shows a block diagram of a flexible power supply device 100 for an AC arc furnace according to an embodiment of the present disclosure.

As shown in FIG. 1, the AC arc furnace flexible power supply equipment 100 includes:

A rectifier bridge 1, an inverter bridge 2, an arc furnace transformer 3, a rectifier bridge controller 4, an inverter bridge controller 5 and an arc furnace electrode position controller 6. The rectifier bridge 1 is connected to an AC power grid, and the arc furnace transformer 3 is connected to the electrodes of the AC arc furnace, wherein, The rectifier bridge 1 includes three-phase rectifier bridge arms 11, 12 and 13, and the inverter bridge 2 includes three-phase inverter bridge arms 21, 22 and 32, and the rectifier bridge arms 11, 12 and 13 and the inverter bridge arms 21, 22 and 23 are sequentially arranged and connected in parallel through positive and negative DC buses. In some embodiments, the inverter bridge 2 includes at least one-phase inverter bridge arm, e.g., any one of the inverter bridge arms 21, 22 and 23.

Each rectifier bridge arm 11, 12, 13 has the same structure and includes an upper rectifier bridge arm 111, a middle rectifier bridge arm 112, a lower rectifier bridge arm 113, as well as a diode bridge arm 114 and a diode bridge arm 115. The upper rectifier bridge arm 111, the middle rectifier bridge arm 112 and the lower rectifier bridge arm 113 are sequentially connected in series. After the diode bridge arm 114 and the diode bridge arc 115 are connected in series, they are parallelly connected at both ends with the middle rectifier bridge arm 112. The connection point of the diode bridge arm 114 and the diode bridge arm 115 is connected to the AC power supply grid. Among them, the connection points of diode bridge arm 114 and diode bridge arm 115 in each rectifier bridge arm 11, 12, and 13 are respectively connected to each phase of the AC power supply grid.

Each inverter bridge arm 21, 22, 23 includes an upper inverter bridge arm 211 and a lower inverter bridge arm 212. The upper inverter bridge arm 211 and the lower inverter bridge arm 212 are connected in series, and the connection point between the upper inverter bridge arm 211 and the lower inverter bridge arm 212 is connected to the arc furnace transformer 3. Among them, the connection points of the upper bridge arm 211 and the lower bridge arm 212 of each inverter bridge arm 21, 22, and 23 are respectively connected to the phases of the arc furnace transformer 3.

In some embodiments, the rectifier bridge controller 4 is responsible for controlling the rectifier bridge 1 and stabilizing the DC voltage of the rectifier bridge.

In some embodiments, the inverter bridge controller 5 is responsible for controlling the inverter bridge 2 and stabilizing the current of the arc furnace.

Figure 2:
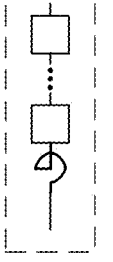
FIG. 2 shows a schematic structure diagram of the upper rectifier bridge arm, the lower rectifier bridge arm, the upper inverter bridge arm and the lower inverter bridge arm according to an embodiment of the present disclosure.

As shown in FIG. 2, the upper rectifier bridge arm 111, the lower rectifier bridge arm 113, the upper inverter bridge arm 211 and the lower inverter bridge arm 212 have the same structure and each formed by connecting a reactor and at least two power modules in series. The power modules can be a half-bridge module as shown in FIG. 4, or a full-bridge module as shown in FIG. 5.

Figure 3:
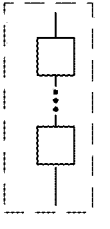
FIG. 3 shows a schematic structure diagram of the middle rectifier bridge arm according to an embodiment of the present disclosure.

As shown in FIG. 3, the middle rectifier bridge arm 112 is composed of at least two power modules in series. The power module can be a half-bridge module as shown in FIG. 4, or a full-bridge module as shown in FIG. 5.

Figure 4:
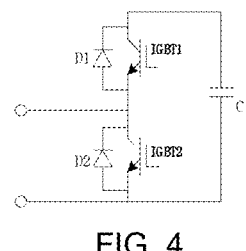
FIG. 4 shows a schematic diagram of the half-bridge module structure of the power module according to an embodiment of the present disclosure.
Figure 5:
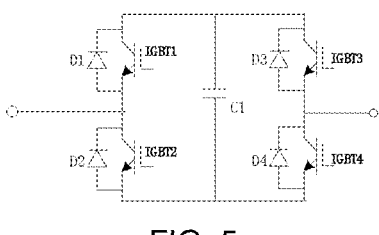
FIG. 5 shows a schematic diagram of the full-bridge module structure of the power module according to an embodiment of the present disclosure.

In some embodiments, in the normal operation process, there is a stable DC voltage on the capacitor of the half-bridge module shown in FIG. 4. For example, in the case of 4.5 kV IGBT, the capacitor voltage is about 2.5 kV, and the half-bridge module can output zero voltage or the capacitor voltage by turning on or off IGBT1 and IGBT2. In the normal operation process, there is a stable DC voltage on the capacitor of the full-bridge module as shown in FIG. 5. For example, in the case of 4.5 kV IGBT, the capacitor voltage is about 2.5 kV, and the full-bridge module can output zero voltage, the capacitor voltage or a negative capacitor voltage by turning on or off IGBT1, IGBT2, IGBT3 and IGBT4.

In some embodiments, the number of the power modules connected in series required by the bridge arm formed by connecting half-bridge modules and/or full-bridge modules in series, for example, the upper rectifier bridge arm 11, the middle rectifier bridge arm 112, the lower rectifier bridge arm 113, the upper inverter bridge arm 211 and the lower inverter bridge arm 212, depends on the maximum voltage across the bridge arms and the capacitor voltage of the power modules.

Taking the inverter bridge 2 as an example, the maximum voltage between the ends of each bridge arm (the upper inverter bridge arm 211 or the lower inverter bridge arm 212) is equivalent to the DC voltage of the rectifier bridge 1. If it is assumed that the DC voltage of the rectifier bridge 1 is 40 kV and the capacitor voltage of the modules is 2.5 kV, in the upper inverter bridge arm 211 or the lower inverter bridge arm 212 of each inverter bridge arm 21, 22, 23 of the inverter bridge 2, the number of modules connected in series is $$\frac{40 \text{ kV}}{2.5 \text{ kV}} = 16,$$

so that the number of modules required by each inverter bridge arm 21, 22, 23 of the inverter bridge 2 is 32.

Figure 6:
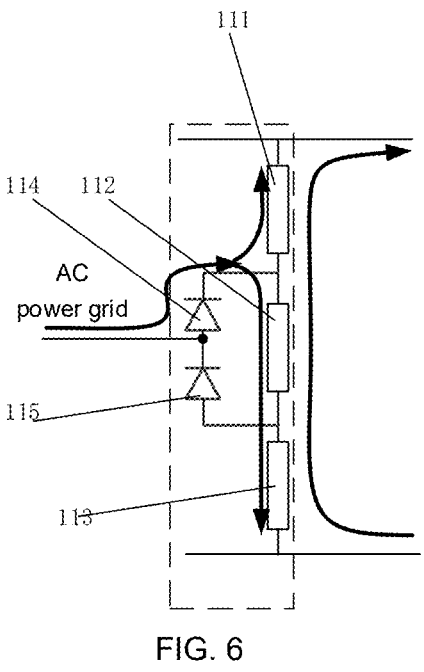
FIG. 6 shows a schematic diagram of the current path in one phase of the rectifier bridge arm of the rectifier bridge when the current of the power grid flows into the rectifier bridge according to an embodiment of the present disclosure.
Figure 7:
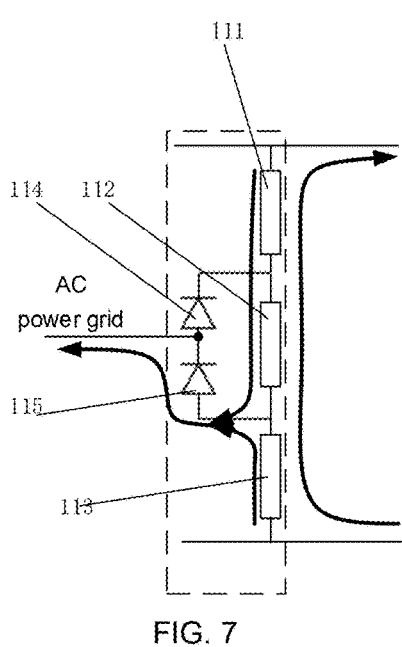
FIG. 7 shows a schematic diagram of the current path in one-phase of rectifier bridge arm when the current of the power grid flows out of the rectifier bridge according to an embodiment of the present disclosure.

Taking the rectifier bridge 1 as an example, considering each rectifier bridge arm 11, 12, 13, in the rectified state. As shown in FIG. 6, when the AC power grid voltage of each rectifier bridge arm is in the positive half wave, and when the AC power grid current enters the rectifier bridge arm, the upper rectifier bridge arm 111 bears the voltage between the positive DC bus and the AC bus, which will not exceed 50% of the DC voltage of the rectifier bridge. And, the lower rectifier bridge arm 113 and the middle rectifier bridge arm 112 jointly bear the voltage between negative DC bus and the AC bus, which is at most the DC voltage of the rectifier bridge. As shown in FIG. 7, when the AC power grid voltage of the bridge arm is at the negative half wave and when the AC power grid current leaves the bridge arm, the upper rectifier bridge arm 111 and the middle rectifier bridge arm 112 jointly bear the voltage between the positive DC bus and the AC bus, which will not exceed the DC voltage of the rectifier bridge. And the lower rectifier bridge arm 113 bears the voltage between the negative DC bus and the AC bus, which is at most 50% of the DC of the rectifier bridge. If it is assumed that the DC voltage of the rectifier bridge 1 is 40 kV and the capacitor voltage of the power modules is 2.5 kV, the middle rectifier bridge arm of the rectifier bridge 1 may be designed to bear at most 50% of the DC voltage of the rectifier bridge, and $$\frac{40 \text{ kV}/2}{2.5 \text{ kV}} = 8 \text{ power}$$

modules are connected in series. Thus, the upper rectifier bridge arm 111 and the lower rectifier bridge arm 113 of the rectifier bridge 1 need to bear at most 50% of the DC voltage of the rectifier bridge, and $$\frac{40 \text{ kV}/2}{2.5 \text{ kV}} = 8 \text{ power}$$

modules need to be connected in series. Each rectifier bridge arm 11, 12, 13 requires 24 power modules, which is obviously less than 32 modules required by each inverter bridge arm 21, 22, 23 in the inverter bridge 2.

In accordance with the embodiment of the present disclosure, the following technical effects are achieved.

1. The dual isolation of the AC arc furnace fluctuation and power supply system is achieved through inverter bridge and rectifier bridge. The AC arc furnace fluctuation first affects the AC current of the inverter bridge, which in turn affects the capacitor voltage of the power module of the inverter bridge, and then affects the voltage and current of the DC bus. Through the accumulation of DC bus voltage and current fluctuations, it then affects the voltage of the rectifier bridge power module, and finally affects the current flowing into the AC power grid. The dual isolation of inverter bridge and rectifier bridge significantly reduces the electrical flicker caused by AC arc furnace fluctuations, and reduces the impact of arc furnace on the power grid.

2. The currents in the upper and lower arms of the rectifier bridge are both sinusoidal currents, and the rectifier bridge control is continuous and stable, and the harmonic on the AC side is very small. Moreover, due to the cascaded power modules, the harmonic current flowing into the power grid is very small, and it is unnecessary to additionally provide any AC filter device.

3. The flexible power supply device for the AC arc furnace is directly connected between the AC power grid and the AC arc furnace, providing power to the AC arc furnace without adding any multi-winding transformers or phase-shifting transformers. Moreover, the flexible power supply device for the arc furnace can directly output a medium voltage, and can be suitable for the retrofit of the existing AC arc furnaces.

4. The maximum voltage borne by the upper and lower arms of the rectifier bridge is only equivalent to the DC voltage of the rectifier bridge minus the voltage of the middle rectifier bridge arm, so that the cost of the rectifier bridge can be significantly reduced. By using diode bridge arms in the rectifier bridge arm, the combined operation of the upper, middle and lower bridge arms of the rectifier bridge is automatically realized, and the system control is simple without increasing the control complexity.

The above is an introduction to the implementation examples of the device. The following further explains the control method of the flexible power supply equipment for the AC arc furnace disclosed in this disclosure through method implementation examples.

The working method of the flexible power supply equipment for the AC arc furnace described in this disclosure is as follows:

Controlling the rectifier bridge through a rectifier bridge controller to achieve stable DC voltage and reduce AC grid flicker, allowing energy to flow from the AC grid to the DC bus through the rectifier bridge. Wherein the input end of the rectifier bridge is connected to the AC power grid, and the DC bus of the output end of the rectifier bridge is connected to the input end of the inverter bridge.

The inverter bridge controller stabilizes the primary side current of the arc furnace transformer, so that energy flows from the DC bus to the arc furnace through the inverter bridge. Wherein the output end of the inverter bridge is connected to the primary side of the AC arc furnace transformer.

The electrode position controller controls the electrode manipulation mechanism of the AC arc furnace and stabilizes the three-phase arc impedance. Wherein the secondary side of the AC arc furnace transformer is connected to the electrode of the arc furnace.

As shown in FIG. 1, the rectifier bridge controller 4 is responsible for controlling the rectifier bridge 1 and stabilizing the DC voltage of the rectifier bridge. The inverter bridge controller 5 is responsible for controlling the inverter bridge 2 and stabilizing the current of the arc furnace.

Figure 8:
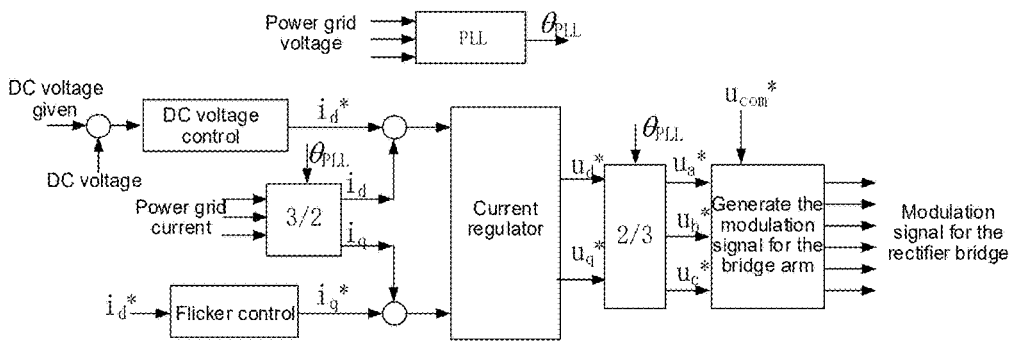
FIG. 8 shows a schematic diagram of a method for operating the rectifier bridge controller in the flexible power supply device for an AC arc furnace according to an embodiment of the present disclosure.

As shown in FIG. 8, the rectifier bridge controller 4 is responsible for controlling the rectifier bridge 1 and stabilizing the DC voltage of the rectifier bridge, and the control method includes the following steps:

In step S1, the rectifier bridge controller 4 detects a grid-side voltage of the rectifier bridge and tracks the phase of the power grid through a phase locked loop (PLL).

In step S2, based on the relationship between a DC voltage $u_{dc}$ of the rectifier bridge and a DC voltage command value $u_{dc}*$ of the rectifier bridge, an active current command value $i_d*$ of the rectifier bridge is generated through a DC voltage controller, wherein, If the DC voltage $u_{dc}$ of the rectifier bridge is too high, reduce the active current command value $i_d*$ of the rectifier bridge. If the DC voltage $u_{dc}$ of the rectifier bridge is too low, increase the active current command value $i_d*$ of the rectifier bridge.

In some embodiments, the DC voltage controller adopts a PI regulator, and the transfer function formula of the PI regulator is as follows:

$$i_d^* = \left(k_p + \frac{k_i}{s}\right) \cdot (u_{dc}^* - u_{dc}),$$

where $k_p$ is a proportional gain coefficient, $k_i$ is an integral gain coefficient, and s is a frequency variable in the complex variable function.

In step S3, based on the active current command value $i_d*$ of the rectifier bridge, the reactive power consumed on a grid-side impedance is calculated, and a reactive current command value $i_q*$ of the rectifier bridge is generated to compensate for the reactive power consumed on the grid-side impedance.

In some embodiments, the generating a reactive current command value $i_q*$ of the rectifier bridge includes the following step:

Assuming the equivalent reactance on the grid side is $L_g$, the grid voltage is $u_g$, and the reactive current command value $i_q*$ of the rectifier bridge is:

$$i_q^* = \frac{L_g i_d^{*2}}{2u_g}$$

In step S4, generating dq voltage command values $u_d*$ and $u_q*$ of the rectifier bridge from the active current command value $i_d*$ of the rectifier bridge and the reactive current command value $i_q*$ of the rectifier bridge through a current regulator, and generating AC modulation command values $u_a*$, $u_b*$ and $u_c*$ of the rectifier bridge through ⅔ conversation.

In step S5, calculating the DC modulation command value $u_{com}*$:

In some embodiments, the DC modulation command value of the rectifier bridge is $$u_{com}^* = \frac{\text{the DC voltage command value } u_{dc}^* \text{ of the rectifier bridge}}{2u_N},$$

where $u_N$ is the capacitor voltage of the power module.

In step S6, adding or subtracting the AC modulation command value $u_a*$, $u_b*$, $u_c*$ of the rectifier bridge and the DC modulation command value $u_{com}*$ of the rectifier bridge, and obtaining a trigger pulse of each rectifier bridge arm according to an AC current direction by nearest level modulation (NLM).

In some embodiments, if the bridge arm current enters each rectifier bridge arm 11, 12, and 13, as shown in FIG. 6, the result of (the DC modulation command value of the rectifier bridge−the AC modulation command value of the rectifier bridge) is subjected to the nearest level modulation to obtain a trigger pulse of the upper rectifier bridge arm 111, and the result of (the DC modulation command value of the rectifier bridge+the AC modulation command value of the rectifier bridge) is subjected to the nearest level modulation to obtain a trigger pulse of the middle rectifier bridge arm 112 and the lower rectifier bridge arm 113. If the bridge arm current leaves each rectifier bridge arm 11, 12 and 13, as shown in FIG. 7, the result of (the DC modulation command value of the rectifier bridge−the AC modulation command value of the rectifier bridge) is subjected to the nearest level modulation to obtain a trigger pulse of the upper rectifier bridge arm 111 and the middle rectifier bridge arm 112, and the result of (the DC modulation command value of the rectifier bridge+the AC modulation command value of the rectifier bridge) is subjected to the nearest level modulation to obtain a trigger pulse of the lower rectifier bridge arm 113.

Through the above operation, regardless of whether the direction of the AC current enters or leaves each phase rectifier bridge arm 11, 12 and 13, the AC current is evenly distributed in the rectifier upper bridge arm 111 and the rectifier lower bridge arm 113. This reduces the control complexity, and improved harmonic performance compared to the topology mixing diode bridge arms with modular multi-level bridge arms.

Taking the phase A of the rectifier bridge as an example:

When the AC current enters the A-phase bridge arm, the trigger pulse of the upper bridge arm is generated according to the modulation command value $u_{com}*-u_a*$ of the rectifier bridge by nearest level modulation, and the trigger pulse of the middle and lower bridge arm is generated according to the modulation command value $u_{com}*+u_a*$ of the rectifier bridge by nearest level modulation. When the AC current leaves the A-phase bridge arm, the trigger pulse of the upper and middle bridge arm is generated according to the modulation command value $u_{com}*-u_a*$ of the rectifier bridge by nearest level modulation, and the trigger pulse of the lower bridge arm is generated according to the modulation command value $u_{com}*+u_a*$ of the rectifier bridge by nearest level modulation.

Figure 9:
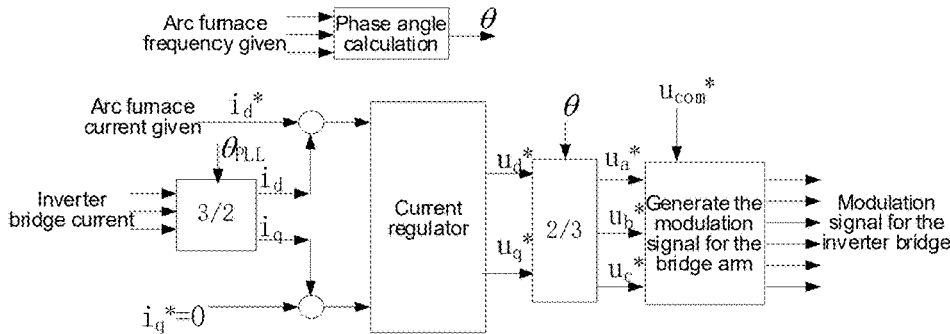
FIG. 9 shows a schematic diagram of a method for operating the inverter bridge controller in the flexible power supply device for an AC arc furnace according to an embodiment of the present disclosure.
Figure 10:
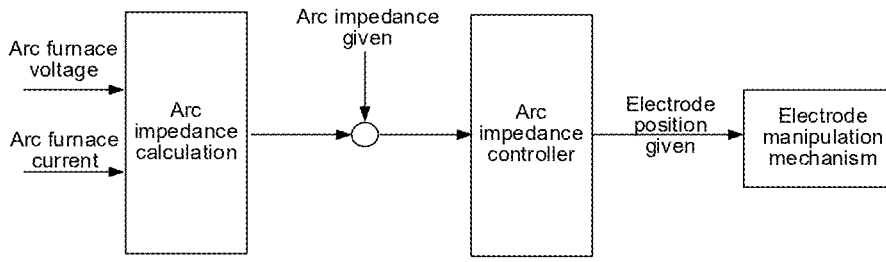
FIG. 10 shows a schematic diagram of a method for operating the electrode position controller in the flexible power supply device for an AC arc furnace according to an embodiment of the present disclosure.

As shown in FIG. 9, the inverter bridge controller 5 is responsible for controlling the inverter bridge 2 and stabilizing the current of the arc furnace, and the control method includes the following steps:

In step S1, a current $i_d$ and a current $i_q$ of the inverter bridge are controlled according to an active current command value $i_d*$ of the inverter bridge and a reactive current command value $i_q*$ of the inverter bridge through a current regulator, and dq voltage command values $u_d*$ and $u_q*$ of the inverter bridge are generated, and AC modulation command values $u_a*$, $u_b*$ and $u_c*$ of the inverter bridge are generated through ⅔ conversion, where the active current command value $i_d*$ of the inverter bridge is a preset value, calculated according to the target current of the arc furnace. And the reactive current command value $i_q*$ of the inverter bridge is preset as 0.

In step S2, calculating the DC modulation command value $u_{com}*$ for the inverter bridge:

In some embodiments, the DC modulation command value of the inverter bridge is $$u_{com}^* = \frac{\text{the DC voltage command value } u_{dc}^* \text{ of the inverter bridge}}{2u_N},$$

where $u_N$ is the capacitor voltage of the power modules.

In step S3, the DC modulation command value of the inverter bridge is subtracted from the AC modulation command value of the inverter bridge to obtain a modulation signal for the upper inverter bridge arm, and the DC modulation command value of the inverter bridge is added with the AC modulation command value of the inverter bridge to obtain a modulation signal for the lower inverter bridge arm, and a trigger pulse of each bridge arm of the inverter bridge is finally obtained by nearest level modulation.

In some embodiments, the inverter bridge controller 5 controls the inverter bridge 2 in the following way: taking the phase A of the inverter bridge as an example: the result of (the DC modulation command value $u_{com}^*$ of the inverter bridge—the AC modulation command value $u_a^*$ of the inverter bridge) is subjected to the nearest level modulation to obtain a trigger pulse of each power module in the upper inverter bridge arm 211, and the result of (the DC modulation command value $u_{com}^*$ of the inverter bridge+the AC modulation command value $u_a^*$ of the inverter bridge) is subjected to the nearest level modulation to obtain a modulation pulse of the lower inverter bridge arm 212.

In some embodiments, the method for controlling the flexible power supply device for an AC arc furnace further includes the following step:

The electrode position controller 6 is responsible for controlling the electrodes of the AC arc furnace by detecting the secondary voltage and current of the AC arc furnace transformer. Then calculate the current three-phase arc impedance of the AC arc furnace based on the secondary voltage and current of the AC arc furnace transformer. And according to the relationship between the current three-phase arc impedance of the AC arc furnace and the arc impedance command value, Generate and send control commands to operate the electrode control mechanism of the arc furnace. If the impedance of the three-phase arc is lower than the arc impedance command value, raise the electrode position to increase the arc impedance. If the impedance of the three-phase arc is higher than the arc impedance command value, lower the electrode position to reduce the arc impedance. If a circuit interruption occurs, lower the electrode position to trigger arc reignition.

In accordance with the embodiment of the present disclosure, the method for controlling the flexible power supply device for an arc furnace realizes the decoupled control of the reciter bridge, the inverter bridge and the electrode position of the arc furnace, thus realizing little interaction and simple and reliable system control. Moreover, the flexible power supply device for the arc furnace is controlled to reliably supply power to the AC arc furnace and stabilize the AC arc so as to improve the production efficiency of the AC arc furnace and reduce the interference of the arc furnace with the power supply system.

Technicians in the relevant field can clearly understand that, for the convenience and conciseness of the description, the specific working process of the described module can refer to the corresponding process in the previous method implementation examples, which will not be repeated here.

The above specific implementations do not constitute any limitations to the protection scope of the present disclosure. It should be understood by those skilled in the art that various modifications, combinations, sub-combinations and substitutions can be made according to the design requirements and other factors. Any modifications, equivalent substitutions and improvements made without departing from the spirit and principle of the present disclosure shall fall into the protection scope of the present disclosure.

The invention claimed is:

1. A flexible power supply device for an AC arc furnace, comprising:

a rectifier bridge, an inverter bridge, an arc furnace transformer, a rectifier bridge controller, an inverter bridge controller and an electrode position controller;

the rectifier bridge is connected to an AC power grid, and the inverter bridge is connected to the AC arc furnace transformer, wherein, the rectifier bridge comprises three-phase rectifier bridge arms, and the inverter bridge comprises at least one-phase inverter bridge arm, and the three-phase rectifier bridge arms and at least one-phase inverter bridge arm are sequentially arranged and connected in parallel through positive and negative DC buses;

the rectifier bridge arms of each phase have the same structure, including an upper rectifier bridge arm, a middle rectifier bridge arm, a lower rectifier bridge arm and two diode bridge arms, and the upper rectifier bridge arm, the middle rectifier bridge arm and the lower rectifier bridge arm are sequentially connected in series, and after the two diode bridge arms are connected in series in the same direction, they are parallel connected at both ends of the middle rectifier bridge arm, and the connection point of the two diode bridge arms is connected to each phase of the AC power supply grid;

the at least one-phase inverter bridge arm has the same structure, including an upper inverter bridge arm and a lower inverter bridge arm, respectively, and the upper inverter bridge arm and the lower inverter bridge arm are connected in series, and the connection point is connected to the corresponding phase of the electric arc furnace transformer, the rectifier bridge controller is specifically used for:

detecting a grid-side voltage of the rectifier bridge, and track the phase of the power grid through a phase lock loop;

based on the relationship between a DC voltage $u_{dc}$ of the rectifier bridge and a DC voltage command value $u_{dc}^*$ of the rectifier bridge, generating an active current command value $i_d^*$ of the rectifier bridge through a DC voltage controller;

based on the active current command value $i_d^*$ of the rectifier bridge, calculating reactive power consumed on a grid-side impedance, and generating a reactive current command value $i_g^*$ of the rectifier bridge to compensate the reactive power consumed on the grid-side impedance;

generating dq voltage command values $u_d^*$ and $u_g^*$ of the rectifier bridge from the active current command value $i_d^*$ of the rectifier bridge and the reactive current command value $i_g^*$ of the rectifier bridge through a current regulator, and generating AC modulation command values $u_a^*$, $u_b^*$ and $u_c^*$ of the rectifier bridge through 2/3 conversation;

calculating a DC modulation command value $u_{com}^*$ of the rectifier bridge:

$$u_{com}^* = \frac{\text{the DC voltage command value } u_{dc}^* \text{ of the rectifier bridge}}{2u_N},$$

where $u_N$ is the capacitor voltage of the power modules; and
  adding or subtracting the AC modulation command value
    of the rectifier bridge and the DC modulation command
    value of the rectifier bridge, and obtaining a trigger
    pulse of each rectifier bridge arm according to an AC
    current direction by nearest level modulation;
the inverter bridge controller is specifically used for:
controlling a current $i_d$ and a current $i_g$ according to an
    active current command value $i_d^*$ of the inverter bridge
    and a reactive current command value $i_d^*$ of the
    inverter bridge through a current regulator, and gener-
    ating dq voltage command values $u_d^*$ and $u_g^*$ of the
    inverter bridge, and generating AC modulation com-
    mand values $u_a^*$, $u_b^*$ and $u_c^*$ of the inverter bridge
    through ⅔ conversion, wherein the active current com-
    mand value $i_d^*$ of the inverter bridge is a preset value,
    and the reactive current command value $i_g^*$ of the
    inverter bridge is preset as 0;
calculating a DC modulation command value $u_{com}^*$ of the
    inverter bridge:

$$u_{com}^* = \frac{\text{the DC voltage command value } u_{dc}^* \text{ of the inverter bridge}}{2u_N},$$

wherein $u_N$ is the capacitor voltage of the power modules;
  subtracting the DC modulation command value of the
    inverter bridge from the AC modulation command
    value of the inverter bridge to obtain a modulation
    signal for the upper inverter bridge arm, and adding the
    DC modulation command value of the inverter bridge
    and the AC modulation command value of the inverter
    bridge to obtain a modulation signal for the lower
    inverter bridge arm, and finally obtaining a trigger
    pulse of each bridge arm of the inverter bridge by
    nearest level modulation.

2. The flexible power supply device for an AC arc furnace
according to claim 1, wherein,
  the inverter bridge comprises three-phase inverter bridge
    arms; and,
  the connection points of the upper and lower bridge arms
    of the three-phase inverter bridge are respectively con-
    nected to each phase of the arc furnace transformer.

3. The flexible power supply device for an AC arc furnace
according to claim 1, wherein,
  the upper rectifier bridge arm, the lower rectifier bridge
    arm, the upper inverter bridge arm and the lower
    inverter bridge arm have the same structure and each
    formed by connecting a reactor and at least two power
    modules in series, and the middle rectifier bridge arm
    is formed by connecting at least two power modules in
    series; and
  the power module is a half-bridge module and/or a
    full-bridge module.

4. The flexible power supply device for an AC arc furnace
according to claim 3, wherein,
  the number of the power modules is determined according
    to the maximum voltage at both ends of the bridge arms
    and the capacitor voltage of the power modules.

5. The flexible power supply device for an AC arc furnace
according to claim 1, wherein the electrode position con-
troller is connected to an electrode manipulation mechanism
of the AC arc furnace.

6. A method for controlling the flexible power supply
device for an AC arc furnace according to claim 1, com-
prising steps of:
  the rectifier bridge controller is responsible for controlling
    the rectifier bridge and stabilizing a DC voltage of the
    rectifier bridge;
  the inverter bridge controller is responsible for controlling
    the inverter bridge and stabilizing a primary side cur-
    rent of the AC arc furnace transformer; and,
  the electrode position controller is responsible for con-
    trolling the electrode manipulation mechanism of the
    AC arc furnace and stabilizing a three-phase arc imped-
    ance,
  the rectifier bridge controller being responsible for con-
    trolling the rectifier bridge and stabilizing a DC voltage
    of the rectifier bridge comprises:
  detecting a grid-side voltage of the rectifier bridge, and
    track the phase of the power grid through a phase lock
    loop;
  based on the relationship between a DC voltage $u_{dc}$ of the
    rectifier bridge and a DC voltage command value $u_{dc}^*$
    of the rectifier bridge, generating an active current
    command value $i_d^*$ of the rectifier bridge through a DC
    voltage controller;
  based on the active current command value $i_d^*$ of the
    rectifier bridge, calculating reactive power consumed
    on a grid-side impedance, and generating a reactive
    current command value $i_g^*$ of the rectifier bridge to
    compensate the reactive power consumed on the grid-
    side impedance;
  generating dq voltage command values $u_d^*$ and $u_g^*$ of the
    rectifier bridge from the active current command value
    $i_d^*$ of the rectifier bridge and the reactive current
    command value $i_g^*$ of the rectifier bridge through a
    current regulator, and generating AC modulation com-
    mand values $u_a^*$, $u_b^*$ and $u_c^*$ of the rectifier bridge
    through ⅔ conversation;
  calculating a DC modulation command value $u_{com}^*$ of the
    rectifier bridge:

$$u_{com}^* = \frac{\text{the DC voltage command value } u_{dc}^* \text{ of the rectifier bridge}}{2u_N},$$

where $u_N$ is the capacitor voltage of the power modules; and
  adding or subtracting the AC modulation command value
    of the rectifier bridge and the DC modulation command
    value of the rectifier bridge, and obtaining a trigger
    pulse of each rectifier bridge arm according to an AC
    current direction by nearest level modulation;
  the inverter bridge controller being responsible for con-
    trolling the inverter bridge and stabilizing a primary
    side current of the AC arc furnace transformer com-
    prises:
  controlling a current $i_d$ and a current $i_g$ according to an
    active current command value $i_d^*$ of the inverter bridge
    and a reactive current command value $i_g^*$ of the
    inverter bridge through a current regulator, and gener-
    ating dq voltage command values $u_d^*$ and $u_g^*$ of the
    inverter bridge, and generating AC modulation com-
    mand values $u_a^*$, $u_b^*$ and $u_c^*$ of the inverter bridge
    through ⅔ conversion, wherein the active current com-
    mand value $i_d^*$ of the inverter bridge is a preset value,
    and the reactive current command value $i_g^*$ of the
    inverter bridge is preset as 0;

calculating a DC modulation command value $u_{com}^*$ of the inverter bridge:

$$u_{com}^* = \frac{\text{the DC voltage command value } u_{dc}^* \text{ of the inverter bridge}}{2u_N},$$

wherein $u_N$ is the capacitor voltage of the power modules;

subtracting the DC modulation command value of the inverter bridge from the AC modulation command value of the inverter bridge to obtain a modulation signal for the upper inverter bridge arm, and adding the DC modulation command value of the inverter bridge and the AC modulation command value of the inverter bridge to obtain a modulation signal for the lower inverter bridge arm, and finally obtaining a trigger pulse of each bridge arm of the inverter bridge by nearest level modulation;

the electrode position controller being responsible for controlling the electrode manipulation mechanism of the AC arc furnace and stabilizing a three-phase arc impedance comprises:

detecting a secondary side voltage and a current of the AC arc furnace transformer;

calculating the current three-phase arc impedance of the AC arc furnace according to the voltage and the current; and according to the relationship between the three-phase arc impedance and an arc impedance command value, generating and sending a control command to manipulate the electrode manipulation mechanism of the arc furnace to adjust the electrode position.

7. A working method for the flexible power supply device for an AC arc furnace according to claim 1, comprising steps of:

controlling, by the rectifier bridge controller, the rectifier bridge to stabilize a DC voltage and reduce the flicker of the AC power grid, so that energy flows from the AC power gird to a DC bus through the rectifier bridge;

stabilizing, by the inverter bridge controller, a primary side current of the arc furnace transformer, so that energy flows from the DC bus to the arc furnace through the inverter bridge; and controlling, by the electrode position controller, the electrode manipulation mechanism of the AC arc furnace and stabilizing a three-phase arc impedance, the rectifier bridge controller being responsible for controlling the rectifier bridge and stabilizing a DC voltage of the rectifier bridge comprises:

detecting a grid-side voltage of the rectifier bridge, and track the phase of the power grid through a phase lock loop;

based on the relationship between a DC voltage $u_{dc}$ of the rectifier bridge and a DC voltage command value $u_{dc}^*$ of the rectifier bridge, generating an active current command value $i_d^*$ of the rectifier bridge through a DC voltage controller;

based on the active current command value $i_d^*$ of the rectifier bridge, calculating reactive power consumed on a grid-side impedance, and generating a reactive current command value $i_g^*$ of the rectifier bridge to compensate the reactive power consumed on the grid-side impedance;

generating dq voltage command values $u_d^*$ and $u_g^*$ of the rectifier bridge from the active current command value $i_d^*$ of the rectifier bridge and the reactive current command value $i_g^*$ of the rectifier bridge through a current regulator, and generating AC modulation command values $u_a^*$, $u_b^*$ and $u_c^*$ of the rectifier bridge through ⅔ conversation;

calculating a DC modulation command value $u_{com}^*$ of the rectifier bridge:

$$u_{com}^* = \frac{\text{the DC voltage command value } u_{dc}^* \text{ of the rectifier bridge}}{2u_N},$$

where $u_N$ is the capacitor voltage of the power modules; and adding or subtracting the AC modulation command value of the rectifier bridge and the DC modulation command value of the rectifier bridge, and obtaining a trigger pulse of each rectifier bridge arm according to an AC current direction by nearest level modulation;

the inverter bridge controller being responsible for controlling the inverter bridge and stabilizing a primary side current of the AC arc furnace transformer comprises:

controlling a current $i_d$ and a current $i_g$ according to an active current command value $i_d^*$ of the inverter bridge and a reactive current command value $i_g^*$ of the inverter bridge through a current regulator, and generating dq voltage command values $u_d^*$ and $u_g^*$ of the inverter bridge, and generating AC modulation command values $u_a^*$, $u_b^*$ and $u_c^*$ of the inverter bridge through ⅔ conversion, wherein the active current command value $i_d^*$ of the inverter bridge is a preset value, and the reactive current command value $i_g^*$ of the inverter bridge is preset as 0;

calculating a DC modulation command value $u_{com}^*$ of the inverter bridge:

$$u_{com}^* = \frac{\text{the DC voltage command value } u_{dc}^* \text{ of the inverter bridge}}{2u_N},$$

wherein $u_N$ is the capacitor voltage of the power modules;

subtracting the DC modulation command value of the inverter bridge from the AC modulation command value of the inverter bridge to obtain a modulation signal for the upper inverter bridge arm, and adding the DC modulation command value of the inverter bridge and the AC modulation command value of the inverter bridge to obtain a modulation signal for the lower inverter bridge arm, and finally obtaining a trigger pulse of each bridge arm of the inverter bridge by nearest level modulation;

the electrode position controller being responsible for controlling the electrode manipulation mechanism of the AC arc furnace and stabilizing a three-phase arc impedance comprises:

detecting a secondary side voltage and a current of the AC arc furnace transformer;

calculating the current three-phase arc impedance of the AC arc furnace according to the voltage and the current; and according to the relationship between the three-phase arc impedance and an arc impedance command value, generating and sending a control command to manipulate the electrode manipulation mechanism of the arc furnace to adjust the electrode position.

\* \* \* \* \*